United States Patent
Alfieri et al.

(10) Patent No.: US 9,127,887 B2
(45) Date of Patent: Sep. 8, 2015

(54) DEVICE AND METHOD FOR TRANSVERSELY MOVING TUBULAR MATERIAL INSIDE A FURNACE

(75) Inventors: Alberto Alfieri, Veracruz (MX); Ricardo Aguilar Lobato, Veracruz (MX)

(73) Assignee: TUBOS DE ACERO DE MEXICO, S.A., Veracruz (MX)

( * ) Notice: Subject to any disclaimer, the term of this patent is extended or adjusted under 35 U.S.C. 154(b) by 722 days.

(21) Appl. No.: 13/503,013

(22) PCT Filed: Oct. 20, 2009

(86) PCT No.: PCT/MX2009/000117
§ 371 (c)(1),
(2), (4) Date: Jul. 11, 2012

(87) PCT Pub. No.: WO2011/049422
PCT Pub. Date: Apr. 28, 2011

(65) Prior Publication Data
US 2013/0157210 A1    Jun. 20, 2013

(51) Int. Cl.
*B65G 25/02* (2006.01)
*F27B 9/20* (2006.01)
(Continued)

(52) U.S. Cl.
CPC ............. *F27B 9/208* (2013.01); *B65G 19/02* (2013.01); *B65G 19/22* (2013.01); *B65G 25/02* (2013.01);
(Continued)

(58) Field of Classification Search
CPC ........... F27B 9/20; F27B 9/208; B65G 25/02; B65G 33/02; B65G 47/26; B65G 19/02; B65G 19/22; B21B 43/02

USPC ........... 432/11, 124; 198/418.7, 459.3, 459.1, 198/469.1, 474.1, 625, 624, 626, 717, 721, 198/722, 725, 726, 728, 729
See application file for complete search history.

(56) References Cited

U.S. PATENT DOCUMENTS 2,983,498 A * 5/1961 MacGregor ................... 432/239
3,512,628 A * 5/1970 Keough ....................... 198/774.4
(Continued)

FOREIGN PATENT DOCUMENTS

| DE | 610544  | 3/1935  |
|----|---------|---------|
| FR | 2271528 | 12/1975 |
| FR | 2462369 | 2/1981  |
| GB | 855099  | 11/1960 |

OTHER PUBLICATIONS

International Search Report dated Jul. 7, 2010, mailed Jul. 9, 2010, for PCT Application No. PCT/MX2009/000117 filed on Oct. 20, 2009.

*Primary Examiner* — Leslie A Nicholson, III
(74) *Attorney, Agent, or Firm* — Knobbe Martens Olson and Bear LLP (57) ABSTRACT

The present invention relates to a device and a method for transversely moving tubular material inside a furnace, in which the tubes are able to roll in order to have a path per cycle that is 2.5 times as great as that obtained in the case of moving bars, and in which the tubes are pushed by a series of toothed bars that have an upward and downward movement plus a horizontal movement in vacuum. The device and a method for moving tubular material inside an furnace allows a greater rotation of the tubes over short cycle times, solves the problems of twisting of smaller-diameter tubes (tubing) in quench furnaces and meets the need to rotate the tubes when there is no forward movement, which may be necessary when cycle times are long or when unloading from the furnace is interrupted.

16 Claims, 7 Drawing Sheets (51) Int. Cl.
 *B65G 33/02* (2006.01)
 *B65G 47/26* (2006.01)
 *B65G 19/02* (2006.01)
 *B65G 19/22* (2006.01)
 *F27B 9/22* (2006.01)
 *B21B 43/02* (2006.01)

(52) U.S. Cl.
 CPC ............... *B65G 33/02* (2013.01); *B65G 47/26* (2013.01); *F27B 9/20* (2013.01); *F27B 9/201* (2013.01); *F27B 9/22* (2013.01); *B21B 43/02* (2013.01)

(56) References Cited

U.S. PATENT DOCUMENTS

| | | | | |
|---|---|---|---|---|
| 3,599,944 A | * | 8/1971 | Erixson | 432/124 |
| 3,792,965 A | * | 2/1974 | Bengtsson | 432/121 |
| 4,102,449 A | * | 7/1978 | Shufran | 198/774.4 |
| 4,321,995 A | * | 3/1982 | Dell et al. | 198/459.1 |
| 4,585,411 A | * | 4/1986 | Bocci et al. | 432/11 |
| 4,687,092 A | * | 8/1987 | Ray | 198/461.1 |
| 5,314,330 A | * | 5/1994 | Orbeck | 432/128 |

\* cited by examiner

FIG. 1
(PRIOR ART)

FIXED RAILS

PUSHER CHAIN

FIG. 2
(PRIOR ART)

FIXED BAR

MOVEABLE BAR

POCKETS NORMALLY EMPTY FOR
EMERGENCY ON SITE MOVEMENT

SEVERAL POCKETS NORMALLY EMPTY
FOR SYSTEMATIC ON SITE MOVEMENT

FIG. 8

PURE ROLLING WITHOUT SLIDING

DEVICE AND METHOD FOR TRANSVERSELY MOVING TUBULAR MATERIAL INSIDE A FURNACE

FIELD OF THE INVENTION

The present invention refers to devices and methods for transversely moving tubular material inside a furnace. More specifically, the present invention refers to a device and method for transversely moving tubular material inside a furnace.

BACKGROUND OF THE INVENTION

There exist several types of devices for moving tubes inside furnaces in the background art.

First, there are furnaces that allow axial movement of tubes such as, for example, barrel, gas or induction tube furnaces, with low yield and low thermal efficiency.

There exist also a great number of furnaces that use transverse movement of tubes in the background art. This movement of tubes inside the furnace is caused by rolling said tubes on a sloped plane of rails. As rolling is not ensured under all circumstances, it is necessary to prepare for manual intervention with adequate tools to ensure said rolling.

Figure 1:
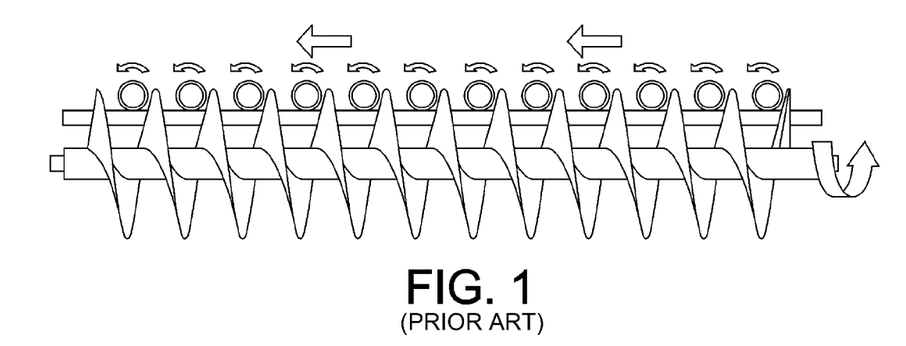
FIG. 1 schematically shows the movement of a screw used in furnaces of the background art.

Successively, there exist other systems that to a larger or lesser extent are at present operating. For example, there is furnaces con screw tube movement, wherein displacement is ensured by screws containing the tubes supported by rails. Its practical application is limited to about 800° C. FIG. 1 shows a diagram of this type of device.

Figure 2:
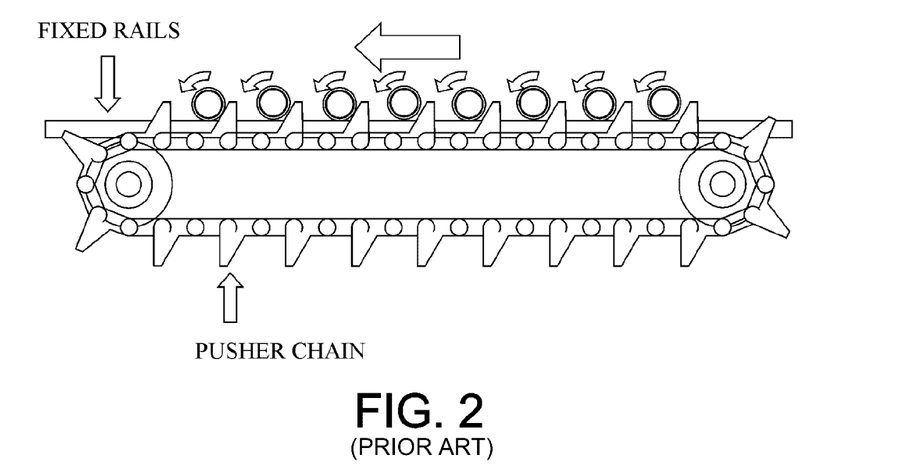
FIG. 2 schematically shows the movement of a chain used in furnaces of the background art.

Chain furnaces are also well known, wherein tubes, supported by rails, are pushed by pushers that go through the hearth and that cooperate with the links of an endless chain, as shown in FIG. 2.

Figure 3:
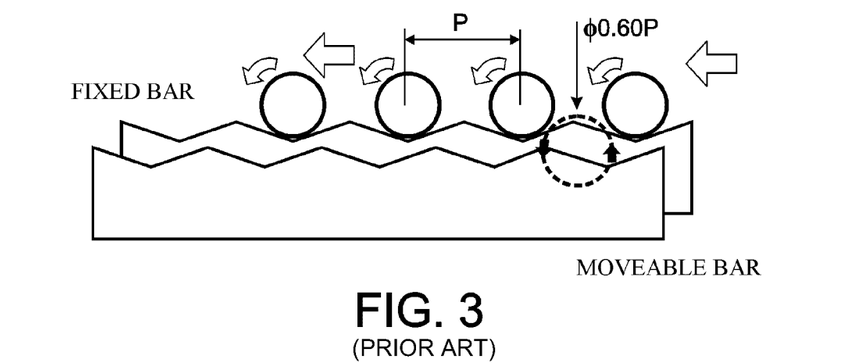
FIG. 3 schematically shows the movement of tubes inside circular movement moveable bar furnaces of the background art.

There are also "moveable bar" furnaces, wherein the tubes are supported by a series of toothed bars (fixed), while another series of toothed bars (moveable) raise, displace and then deposit the same one teeth ahead. The path of moveable bars is originally circular, as shown in FIG. 3, and has a smaller diameter than the toothed pitch of the bars, whereby the tubes rotate on each take action (on the moveable bar) and each release action, (on the fixed bar). The diameter of the path is 0.6 multiplied by the pitch, whereby a rotation of 0.2 times the pitch in the take action and of 0.2 times the pitch in the release action is attained, whereby the overall rotation is of 0.4 times the pitch per each forward movement. It is clear that the smaller is the diameter of the tube for a given pitch, the more it will rotate, and vice-versa.

Figure 4:
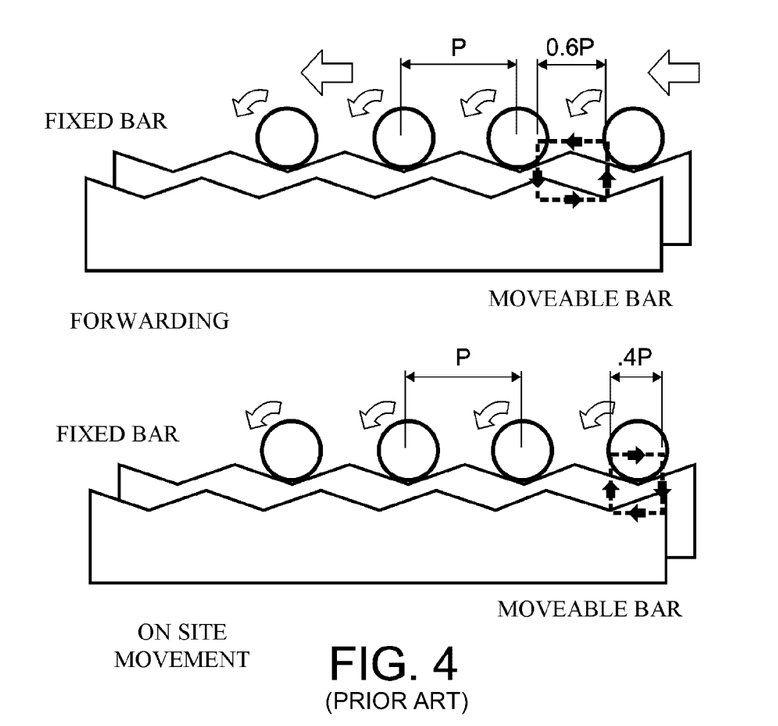
FIG. 4 graphically shows the forward movement of moveable bar furnaces but with a substantially rectangular movement, as well as the "on site" movement of the background art.

Alternatively, there still are furnaces with a movement of the bars more or less rectangular with a raising mechanism and a displacement mechanism that allow, besides the forward movement as the previous system, also the movement "on site" wherein the tubes are raised to be forwarded but deposited in the same pocket, with a geometry that allows a rotation always of 0.4 times the pitch, as shown in FIG. 4.

At present, for quench furnaces, chain furnaces and moveable bar furnaces are considered suitable.

Chain furnaces went popular due to the great simplicity of its mechanism and the lesser need to provide refractory steels that are costly. However, the capability of these furnaces to quench is being analyzed due to a series of problems suffered by the pushers, originally attributed to the thermal stress suffered with the successive heating and cooling actions.

Besides this problem, it should be noted that the thermal efficiency of this type of furnaces will always be penalized by the losses incurred when heating the pushers every time.

In this context, unless very low productivities that impose very strong investment restrictions that lead to consider barrel furnaces, or chain furnaces, "moveable bar" furnaces are the natural option.

Notwithstanding moveable bar furnaces are the most adequate option for quench furnaces, there are some limitations. It is clear that efficiency of a furnace is higher when the hearth is highly occupied, that is, when the highest number of tubes is placed inside.

In a moveable bar furnace, the minimum distance between the tubes is about 15% of the tube diameter, while a reduced distance increases the residence times up to 60% being the heating period independent from the distance.

Figure 5:
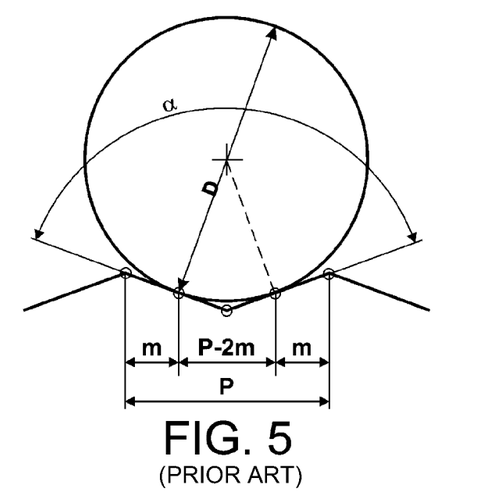
FIG. 5 schematically shows a graphic showing the limitations of moveable bar furnaces.

As a furnace usually has to handle different diameters, the selection of the bar tooth pitch is fundamental. It is clear that if "toothing" of the bars has a sufficiently small pitch, the loading distance of tubes can be selected to optimize the same, but it is not advisable to place the tubes on the toothing corners. In this sense, it is considered that with a toothing angle alpha, the maximum diameter D of the tube to load in a pitch "p" is D according to the following formula:

$$D = (p - 2m)/\cos(\text{alpha}/2) \quad \text{(Formula 1)}$$

wherein "m" is the horizontal distance from a contact point of the tube on the "V", to the tooth corner, that is, the tolerance taken to prevent the tube from resting on the corners, as shown in FIG. 5.

Therefore when the diameter dispersion is high, being the minimum pitch determined by the higher diameter tube, it could happen that most of the tubes processed by the bar system is not optimum, that is, the furnace is not sufficiently loaded.

Thus, if one desires to improve the productivity for lower diameter tubes, the solution is to increase the length and, therefore, the cost of the furnace.

Also, moveable bars must support the total weight loaded in the furnace, so the operating machinery should have great dimensions and power, and therefore they are costly.

Another drawback/limitation of the moveable bar systems is that the tube rolling capability for shorter cycle times is very limited. The minimum displacement period of the bars, that is, to cover the complete "rectangle", is generally from 9 to 11 seconds. This means that, for cycle times shorter than 20 to 22 seconds, the period is not enough to make "on site" movements between two forward movements.

Consequently, with low diameter and thickness tubes, the rolling movement is limited to 0.4 the pitch for each forward movement, precisely in tubes that are easily likely to twisting by anisotropy of heating.

BRIEF DESCRIPTION OF THE INVENTION

It is an object of the present invention to provide a device and method for transversely moving tubular material inside a furnace wherein the tubes are able to roll in order to have a path per cycle that is 2.5 times as great as that obtained in the case of moving bars It is another object of the present invention to provide a device and method for transversely moving tubular material inside a furnace wherein the tubes are pushed by a series of toothed bars that have an upward and downward movement plus a horizontal movement in vacuum.

It is another object of the present invention to provide a device and method for moving tubular material inside a furnace that allows a greater rotation of the tubes over shorter cycle times.

It is another object of the present invention to provide a device and method for horizontally moving tubular material inside a furnace that helps to solve twisting problems in smaller diameter tubes in quench furnaces (tubing).

It is also an object of the present invention to provide a device and method for moving tubular material inside a furnace that meets the need to rotate the tubes when there is no forward movement, which may be necessary when cycle times are long or when unloading from the furnace is interrupted.

DETAILED DESCRIPTION OF THE INVENTION

In order to improve the pitch of moveable bars of new furnaces for thermal treatment, it has been proposed a method for moving the tubes, which is described and analyzed as to its basis and embodiment as follows.

If instead of the rolling movement/forward movement/rolling movement, that only makes the tubes rotate at a rate of 0.4 of the pitch, the tubes roll—as in a chain furnace or screw furnace, they would cover one pitch per cycle, that is 2.5 times what the tubes rotate in the moveable bars.

Figure 6:
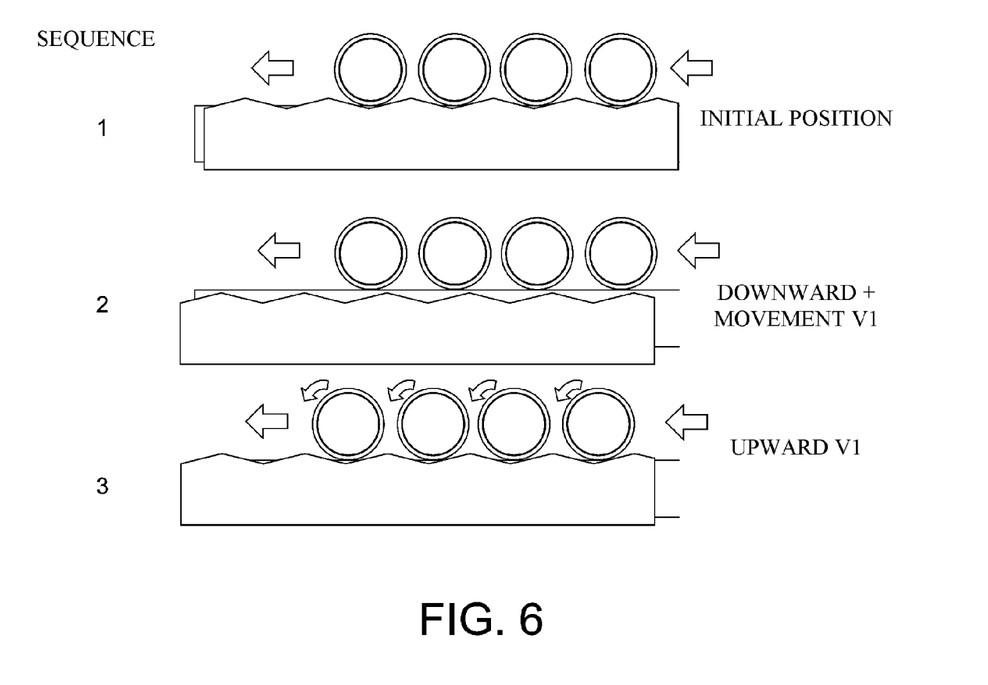
FIG. 6 is an operation sequence scheme of the method of the present invention without a retaining bar.

So far no news, the news is that the tubes are pushed by a series of toothed bars, very similar to moveable bars that make an upward movement (active movement) and downward movement, and a horizontal movement in vacuum, as the one shown in the sequence of FIG. 6.

This type of displacement, compared to the traditional moveable bars, has the following advantages:

Said greater rotation of the tubes over shorter cycle times contributes to solve the problems of twisting smaller-diameter tubes (tubing) in quench furnaces.

The refractory steel bars and the moving machine are much lighter, as—clearly—there is no need to raise all the tubes, but, merely to make them roll over a horizontal surface. Cost is significantly influenced by these circumstances, especially when dealing with heavy tubes.

The bars may have a lower pitch than the one defined for the major tube, while, as the tube is not supported by the bar, it is accurate to say that the tip of the bar may push it to rolling.

Notwithstanding this system is notably simple, it is not ensured that the tubes, resting over the rolling rails at the end of each pushing, do not move waiting for the next push cycle, particularly if they are not straight.

Figure 7:
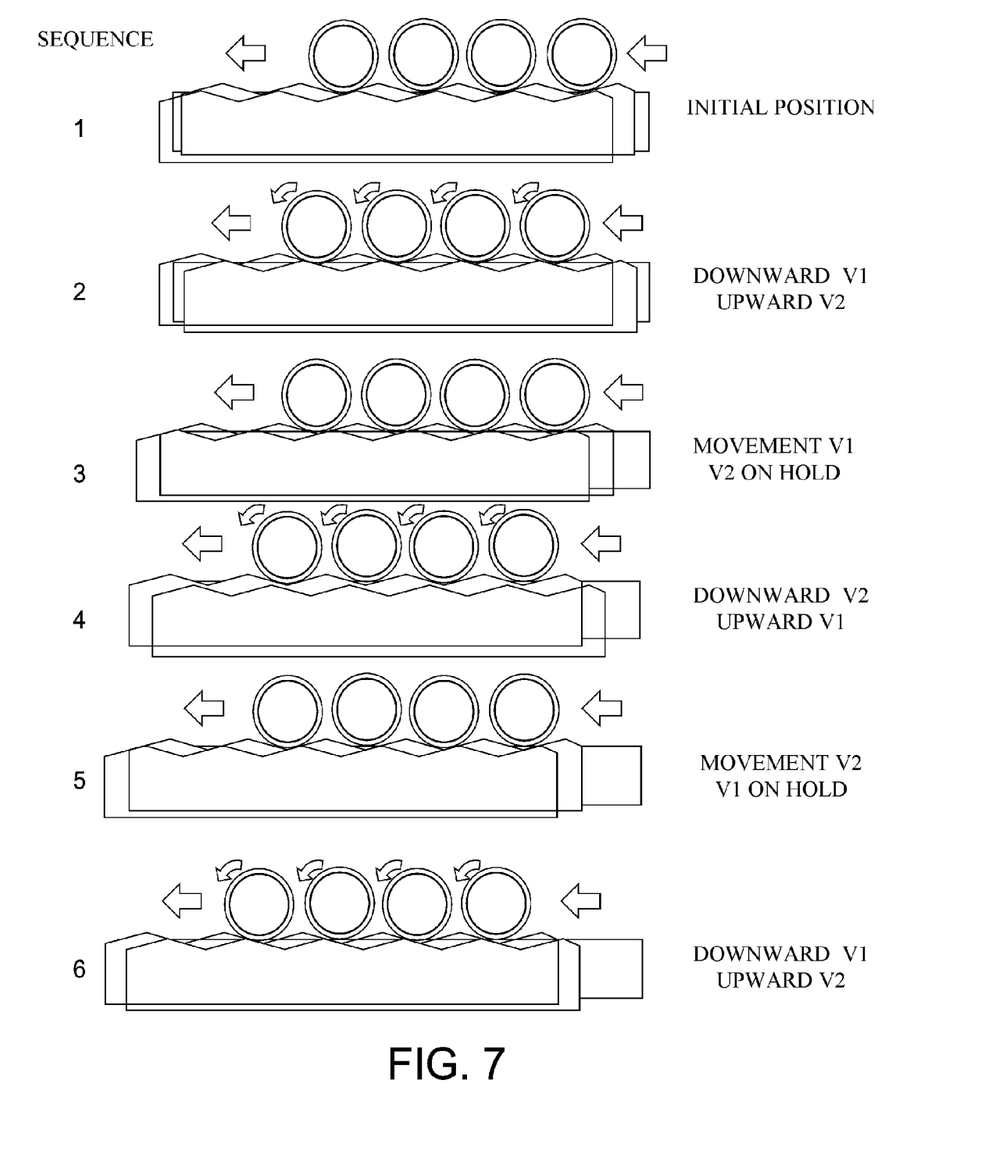
FIG. 7 shows the operation sequence of the method of the present invention with the use of an additional retaining bar.

This drawback is solved by adding another moveable bar synchronized with the preceding, as shown in FIG. 7.

The need for this second "retaining" bar is more evident with small diameter and thickness tubes, which are more likely to twisting. On the other hand in case of greater diameter tubes and significant thicknesses this bar could be absent.

It is necessary that displacement systems meet the need of the movement known as "on site" movement that is a way of rolling the tubes when there is no forward movement, which may be necessary when cycle times are long or when unloading from the furnace is interrupted.

To this end, the following actions have been taken:

Shorter cycle times of up to 20-0.40 seconds.

In these cases a traditional moveable bar furnace would not make the "on site" movement systematically, or at the most it would make an "on site" movement per each forward movement. It is accurate to say that a new movement, that makes the tube rotate more than a moveable bar furnace, does not provide a systematic "on site" movement at all.

Figure 8:
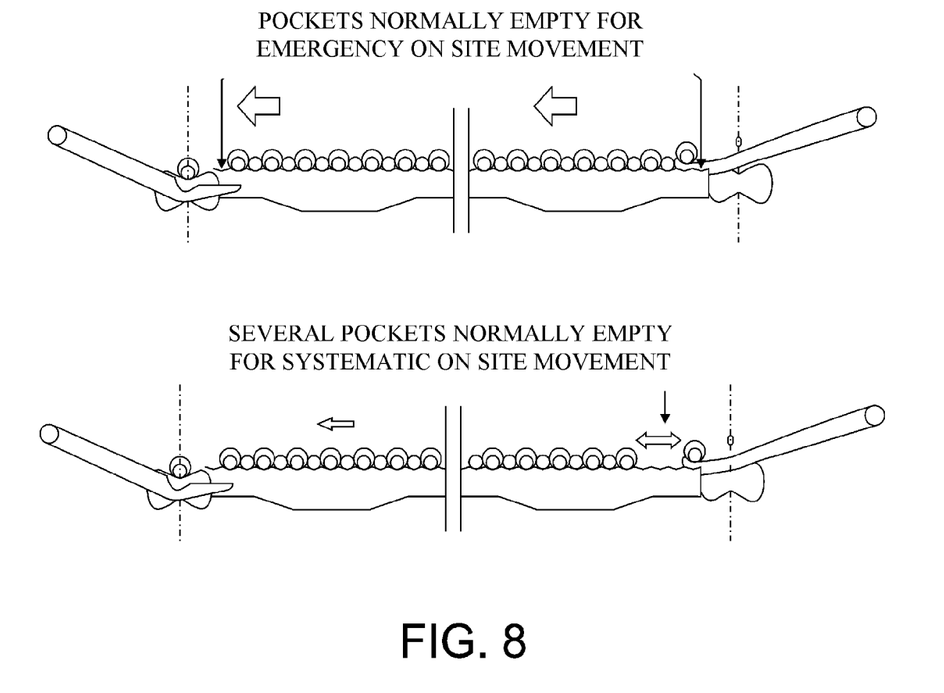
FIG. 8 schematically shows a configuration of an embodiment of the present invention to make the "on site" movement with the method of the present invention for shorter cycle times (20-40 sec).

On the other hand, an "on site" movement is necessary when unloading is interrupted, to this end, unloading from the furnace, by a kick-off that transfers the bars to the roll rail, is from the second (or third) from last tube position, that is one (or two) positions before unloading as shown in FIG. 8.

When unloading is interrupted, the system will make the load of the furnace rotate forward one (or two) positions, and then backwards to the same extent. This is repeated until the end of the interruption that is when returning to the original position it continues as originally.

Longer cycle times of more than about 40 seconds.

These are greater thickness tubes, generally of a greater diameter too. In these cases, the tubes are rotated "on site" systematically to ensure a better quality heating.

In this case the "on site" movement is the result of forward rotations,—immediately when loading—and backwards—immediately when downloading.

Figure 9:
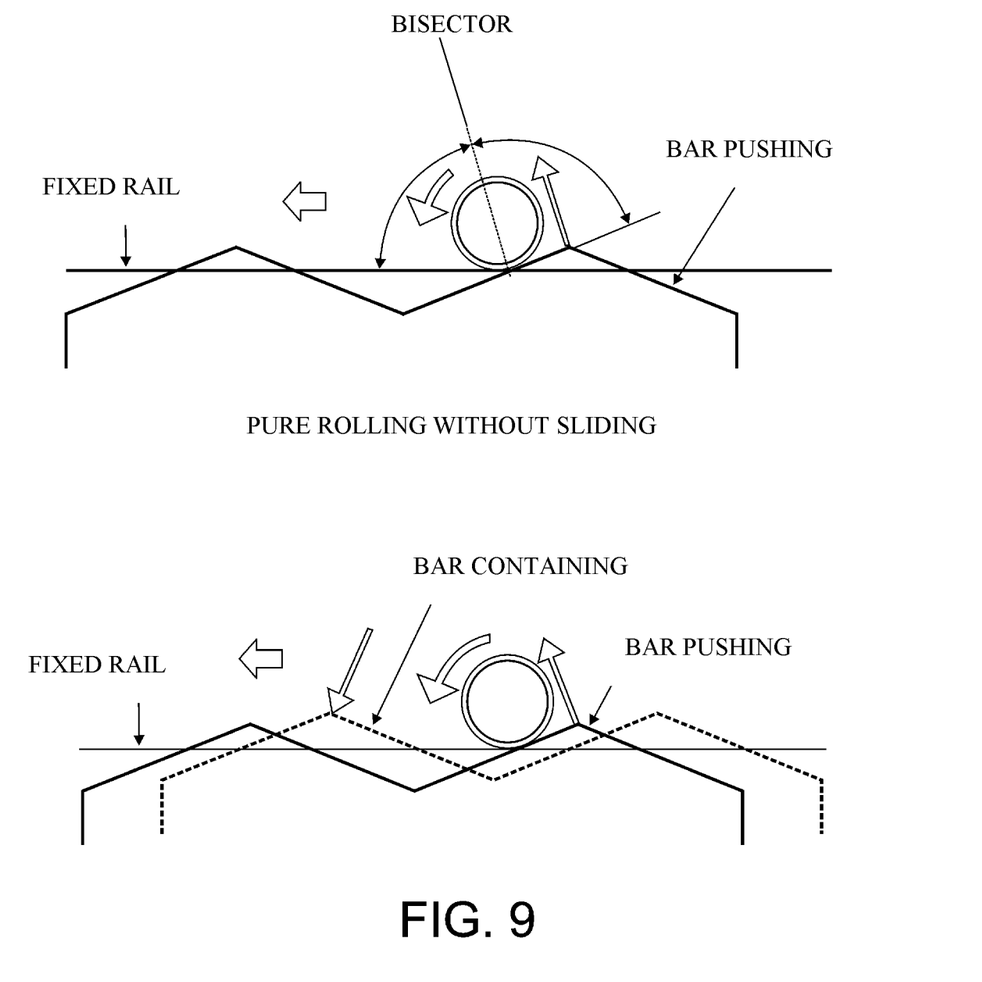
FIG. 9 schematically shows a configuration of an embodiment of the present invention to make the "on site" movement with the method of the present invention for long cycle times (>40 sec).

This supposes to leave a number of empty positions that depends on the ratio between tube diameter/length of pitch/cycle time of the bars/rhythm of the furnace, as shown in FIG. 9.

In all cases, an "on site" movement will take place so that the backwards rotation means—at least—something close to a tube half-turn.

In another embodiment of the present invention, this system allows to refine the movement in order to avoid friction between the pusher teeth and the tube, which would be admissible, especially in medium-small tubes, therefore it is devised for big and heavy tubes.

Figure 10:
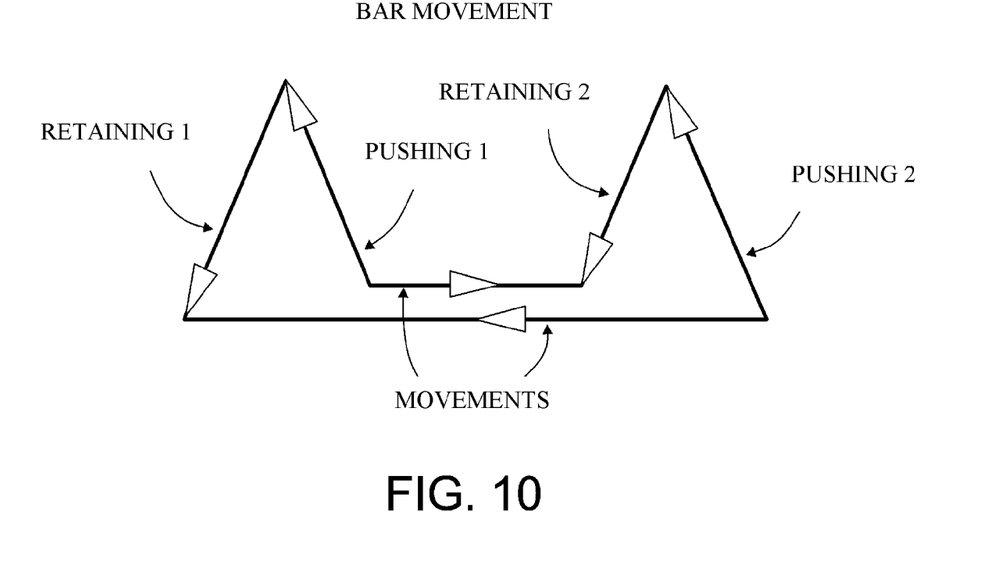
FIG. 10 schematically shows another embodiment of the present invention with a sophisticated movement to prevent friction between the pusher and the tube.

As shown in FIG. 10, to attain rolling, without displacing the tube, over the pusher teeth, it is necessary that they are raised with a movement parallel to the bisector of the angle formed by the pusher tooth and the support rail. As big and heavy tubes are the ones that will need "on site" movement the most, pusher bars will be located as shown in FIG. 10.

What is claimed is:

1. A device for transversely moving tubular material inside a furnace, comprising:

at least one fixed bar with a planar upper surface to allow rolling of a tube on said planar surface; and at least two moveable toothed bars with a toothed upper surface that provides recesses to house and to move the tube, the recesses being first and second contact surfaces;

wherein the first contact surface forms an acute angle to the horizontal and is defined by the planar upper surface of said at least one fixed bar;

wherein the second contact surface forms an obtuse angle to the horizontal, also defined by the planar surface of said at least one fixed bar;

wherein the at least two moveable toothed bars are configured to alternatively move upward, downward and horizontally allowing rolling of the tube along said at least one fixed bar during the alternate upward movement of both toothed bars by the first contact surface, and retaining the tube in a given position between the upward movement of the first moveable bar and the upward movement of the second moveable bar by the second contact surface; and wherein rolling is produced from the contact of said first contact surface with the tube to the contact the second contact surface with the tube.

2. A method for transversely moving tubular material inside a furnace according to the device of claim 1, characterized in that the tube rolls through a fixed planar bar driven by the alternating movement of at least a moveable toothed bar.

3. The device of claim 1, wherein the tube is not raised.

4. The device of claim 1, wherein the at least two moveable toothed bars are configured to roll the tube forwards and backwards.

5. The device of claim 1, wherein the first contact surface contacts the tube at a bisector of an angle formed by the first contact surface and the fixed bar.

6. The device of claim 1, wherein the device is configured to allow on site movement.

7. A method for transversely moving tubular material inside a furnace, comprising:

moving at least one moveable bar upward, downward and horizontally in order to roll at least one tube along at least one fixed bar with a planar upper surface to allow rolling of the at least one tube on said planar surface, said at least one movable bar having a toothed upper surface that provides recesses to house and to move the at least one tube, the recesses being first and second contact surfaces, wherein the first contact surface forms an acute angle to the horizontal and is defined by the planar upper surface of said at least one fixed bar, and wherein the second contact surface forms an obtuse angle to the horizontal, also defined by the planar surface of said at least one fixed bar; and rolling the at least one tube by the contact of said first contact surface with the at least one tube to the contact the second contact surface with the at least one.

8. The method of claim 7, wherein the at least one tube is not raised.

9. The method of claim 7, wherein the at least one moveable bar is configured to roll the tube forwards and backwards.

10. The method of claim 7, wherein the first contact surface contacts the at least one tube at a bisector of an angle formed by the first contact surface and the fixed bar.

11. The method of claim 7, further comprising providing on site movement of the at least one tube.

12. A method for transversely moving tubular material inside a furnace, comprising:

moving at least two moveable toothed bars alternatively upward, downward and horizontally to roll at least one tube along at least one fixed bar with a planar upper surface during the alternate upward movement of both moveable bars by the first contact surface, and to retain the at least one tube in a given position between the upward movement of the first moveable bar and the upward movement of the second moveable bar by the second contact surface, the at least two moveable toothed bars having a toothed upper surface that provides recesses to house and to move the tubes, the recesses being first and second contact surfaces, wherein the first contact surface forms an acute angle to the horizontal and is defined by the planar upper surface of said at least one fixed bar, wherein the second contact surface forms an obtuse angle to the horizontal, also defined by the planar surface of said at least one fixed bar; and rolling the tube by contact of said first contact surface with the at least one tube to the contact the second contact surface with the at least one tube.

13. The method of claim 12, wherein the at least one tube is not raised.

14. The method of claim 12, wherein the at least two moveable toothed bars are configured to roll the at least one tube forwards and backwards.

15. The method of claim 12, wherein the first contact surface contacts the at least one tube at a bisector of an angle formed by the first contact surface and the fixed bar.

16. The method of claim 12, further comprising providing on site movement of the at least one tube.

* * * * *